(12) United States Patent
Loose et al.

(10) Patent No.: US 7,753,583 B2
(45) Date of Patent: Jul. 13, 2010

(54) OUTSIDE AIR THERMOMETER

(75) Inventors: Bernd Loose, Wremen (DE); Gert Koenig-Langlo, Wremen (DE)

(73) Assignee: Stiftung Alfred-Wegener-Institut fuer Polar-und Meeresforschung, Bremerhaven (DE)

( * ) Notice: Subject to any disclaimer, the term of this patent is extended or adjusted under 35 U.S.C. 154(b) by 253 days.

(21) Appl. No.: 11/713,497

(22) Filed: Mar. 3, 2007

(65) Prior Publication Data

US 2007/0242723 A1 Oct. 18, 2007

(30) Foreign Application Priority Data

Mar. 4, 2006 (DE) .................... 10 2006 010 946

(51) Int. Cl.
*G01K 13/02* (2006.01)
*G01K 1/08* (2006.01)
(52) U.S. Cl. .................. 374/138; 374/148; 374/208
(58) Field of Classification Search .......... 374/138, 374/148, 208
See application file for complete search history.

(56) References Cited

U.S. PATENT DOCUMENTS

| | | | |
|---|---|---|---|
| 2,900,821 A * | 8/1959 | Rich | 374/138 |
| 6,247,360 B1 | 6/2001 | Anderson | |
| 7,150,560 B2 * | 12/2006 | Hanson et al. | 374/141 |
| 2007/0064766 A1 * | 3/2007 | Benning et al. | 374/138 |
| 2008/0159354 A1 * | 7/2008 | Fleming et al. | 374/138 |

FOREIGN PATENT DOCUMENTS

| | | |
|---|---|---|
| DE | 3634539 C2 | 4/1988 |
| DE | 4334509 C2 | 4/1995 |
| DE | 10312660 | 10/2004 |
| GB | 2175693 | 12/1986 |

OTHER PUBLICATIONS

Internet Product Specification, Downloaded Feb. 28, 2007: Wetterhuette Typ 430, 1 Page.
Internet Product Specification, Downloaded Feb. 28, 2007: Wetterhuette Typ 440, pp. 1-3.
Internet Product Specification, Downloaded Feb. 28, 2007: Thies Clima, Temperatur, Elektrische Messwertgeber, pp. 1-3.

* cited by examiner

*Primary Examiner*—Gail Verbitsky
*Assistant Examiner*—Mirellys Jagan
(74) *Attorney, Agent, or Firm*—Leydig, Voit & Mayer, Ltd.

(57) ABSTRACT

An apparatus for measuring the temperature of outside air provided with a thermometer mounted in a housing connected to a forced ventilation blower for drawing a current outside air across the thermometer and with a Venturi nozzle having an air penetration opening disposed orthogonally relative to the air current for generating vacuum pressure and prevent reverse flow of air through the housing.

20 Claims, 3 Drawing Sheets

OUTSIDE AIR THERMOMETER

BACKGROUND OF THE INVENTION

1. Field of the Invention

The invention, in general, relates to a novel outside air thermometer and, more particularly, to an outside air thermometer provided, in a common housing having air intake and output openings, with a temperature sensor and a device including an electrically powered blower for forced ventilation.

2. The Prior Art

Such outside air thermometers are used as stationary apparatus in weather stations. They serve to measure the air temperature prevailing at the measuring site as precisely as possible and undistorted by sun irradiation or vaporization effects. For this purpose, the actual sensors of such apparatus are insulated by being mounted in double-walled housings which are open at their top and bottom and are provided with an active forced ventilation system. For measuring the temperature, an electrically driven blower sucks ambient air through the chamber formed by the inner wall of the double-walled housing provided with the sensor and, at the same time, for cooling the housing heated by sun irradiation it sucks ambient temperature through the outer chamber formed for insulation between the inner and outer wall of the double-walled housing. The forced feeding of air in the sequence of intake opening-sensor-blower-output opening prevents the heat loss or dissipation of the blower from reverting to the sensor and distorting the result of the measurement.

In principle such a system operates satisfactorily, even with strong blowers, in respect of many common ambient conditions, particularly in regions subject to strong sun radiation. However, in areas where strong winds prevail, such as, for instance, coastal regions, mountains or in antarctica, the result of measurements may be distorted by the fact that wind blowing at speeds exceeding 15 m/sec may lead to air-flow reversal in the interior of the temperature gage, increased forced air feeding notwithstanding. Depending upon the angle at which the wind impinges the dynamic head may cancel the counter pressure of the blower and affect an reverse flow of air which feeds the heat dissipated by the blower to the temperature sensor. For reasons of energy efficiency, the power of the blower cannot be arbitrarily be raised, especially in uninhabited regions, because the required energy either is not available or because of the increasing heat loss of an enlarged blower and the housing in which it is mounted which would have to be disproportionately large.

For specific purposes, numerous systems are available in the area of external air temperature measuring. In particular, in automotive technology measuring the air temperature surrounding internal combustion engines is used for managing engines in a manner satisfying all environmental conditions as they develop. Fuel mixtures, ignition timing, etc. are optimized by way of the ambient air temperature as well as engine or coolant temperature not only for satisfactory cold starting conditions but also for operation after the engine has warmed up. Such uses do not require precision measurement of the kind necessary for scientific research. Also, in moving measuring systems the impact of heat loss sources may be reduced by making use of the moving air. However, in stationary measuring systems of the kind used in meteorology for weather forecasts and other research systems, protection from sun irradiation and other weather conditions such as wind, dew, etc. is of decisive importance.

From German DE 43 34 509 a thermometer for measuring outside temperature is known which can be mounted on the wall of houses. For protecting it from sun irradiation, its temperature sensor is mounted in a tube through which an external air current is flowing from below in an upward direction. It is forced by an electrically powered blower disposed above the temperature sensor. Behind the blower, the air is dispersed upwardly between the housing of the measuring system and the wall of the house such that the air heated by the blower cannot reach the sensor. The entire system is provided with electric current for the blower and the measuring electronics by a solar panel integrated into the front wall of the housing of the apparatus. The mounting on the wall of a house is disadvantageous which, by being heated by sun irradiation, generates an upwardly directed thermic and which feeds air to the measuring apparatus which is too warm and distorted with respect to the temperature of the ambient air. This circumstance and the provision of the system with solar cells and radiation protection tube which make mounting the apparatus at a location exposed to sun irradiation mandatory, contradict each other so that at least as to more stringent measurement requirements satisfactory results may are not to be expected. Moreover, turbulence occurring at the wall of a house at strong winds may lead to wrong results if the air because of a dynamic head above the measuring apparatus is caused to flow through the air channel downwardly from above so that the heat dispersion of the blower distorts the measuring result at the sensor.

Professional outside air thermometers provided as standard equipment with stepped radiation protection (Type 430) or, optionally, (Type 440) with forced air feeding by means of blowers, are respectively known from Internet product specifications "Temperatursensor Mit Strahlungsschutz und Zwangsbelueftung, Wetterhuette Type 430" (www.koneis.at/download/430_dT.pdf) and "Wetterhuette Type 440" (www.kroneis.at/download/440.pdf). Both apparatus are intended for exposed mounting on masts in weather stations. Protection from measuring value distortions in case of strong wind is not provided for either apparatus. Another Internet product specification "Temperatur, Elektrische Messwertgeber" (www.thiesclima.com/temperatur/elektrische_messwertgeber.htm#lufttemp), which being the closest state of prior art forms the basis of the instant invention, also discloses a professional outside air thermometer (ventilated air temperature gage) which in addition to the common radiation protection is provided with forced air ventilation by means of blowers as standard equipment. This apparatus, too, is intended for exposed mounting, yet no provision is made for protection from distorted measurement values as a result of strong wind.

The state of the art seems to indicate that the distorting effect of strong wind is either not known to either manufacturers or users or is considered to be negligible.

OBJECT OF THE INVENTION

Proceeding from the outside air thermometer of the last-mentioned Internet product specification, it is an object of the present invention to provide for an outside air thermometer which while in addition to such common characteristics as radiation protection and forced air cooling being provided with effective protection against distorted measurement values as a result of strong wind is of simple and cost-efficient construction and easy operability.

BRIEF SUMMARY OF THE INVENTION

In the accomplishment of this and other objects the invention provides for an outside air thermometer provided with forced air cooling including a Venturi nozzle the nozzle housing of which is connected to an air output opening by an additional air penetration opening disposed orthogonally relative to the flow-through direction, whereby outside air flowing through the Venturi nozzle generates vacuum pressure at the air penetration opening.

Other objects and advantages of the invention will in part be obvious and will in part appear hereinafter.

For a preferred use in exposed weather stations for climatological purposes, the outside air thermometer in accordance with the invention is provided, in addition to its equipment against measurement errors caused by sun irradiation such as improved insulation and forced ventilation, with a device for preventing faulty measurements under conditions of strong winds, for instance in excess of 15 m/sec. It is constituted by a housing structured as a Venturi nozzle extending from an upper section of the sensor housing. When air flows through it, the Venturi nozzle causes the air flow speed to be increased at its narrow section and generates, centrally above the air penetration opening disposed orthogonally at this section, vacuum pressure which supplements the suction of the outside air fed for measuring and cooling purposes between the air intake and air output openings by the blower. The Venturi tube suction power is a function of the wind speed and of the shape of the Venturi tube. At weak and moderate winds, e.g. 15 m/sec, the major portion of the forced ventilation of the sensor is provided by an electrically powered blower. The outside air is sucked into the sensor housing and across the sensor from below and fed in an upward direction out of the sensor housing between the lower and upper sections of the nozzle. This leads to the outside air heated by the heat loss of the blower and the radiation heat of the housing and fed through the sensor housing being taken away and dispersed by the wind flowing horizontally through the Venturi tube. The suction of the blower is increased by the effect of the vacuum pressure generated at the air penetration opening at the lower section of the Venturi nozzle as a function of the wind speed and geometry of the nozzle. If wind speeds in excess of 15 m/sec are reached of at which without a Venturi nozzle the dynamic head of the air at the air output opening of the sensor housing would be greater than the pressure the blower is capable of generating, the Venturi nozzle begins to act. Because of the action the suction at the air penetration opening at the lower section of the nozzle which increases with the speed of the wind any air flow reversal can no longer occur and circulation of undistorted air around the sensor is ensured. Substantial field trials with the novel outside air thermometer compared to prior art apparatus did unambiguously prove the effectiveness of the invention. While Venturi nozzles and their effect are sufficiently known from many applications, both theoretical and practical, nothing has become known to use nozzles of this kind which are primarily used for mixing fluids in the present context of augmenting the action of blowers in outside air thermometers. Reference may be had to German patent specification DE 36 34 539 as being representative of a large number of publications relating to the use of Venturi nozzles. It discloses a Venturi nozzle of an especially simple structure for use in automotive applications for setting the mixture of fuel and air in carburetors.

An especially advantageous embodiment of the outside air thermometer in accordance with the invention may be obtained by forming the nozzle housing from two rotationally symmetric components as lower and upper nozzle components, each of which being provided with the same kind of convexly shaped semi surface centrally arranged in parallel above each other and connected by at least three spacers such that the convexly shaped semi surfaces face each other and the distance between them from all directions toward the center is reduced identically, and by connecting the lower rotationally symmetric component to the sensor housing without any gap formed between them. The Venturi nozzle consists of two similar rotationally symmetric parts, i.e. the lower and the upper nozzle component. The lower component is provided with suitable connection means such as, for instance, a screw connector, for connecting it to the sensor housing. At its bottom the lower component is substantially planar and towards it top it has a convexly curved semi-surface. The upper component of the nozzle which is centrally mounted above and at some distance from the lower component has an identically convexly curved semi-surface, at least in a direction pointing downwardly toward the lower nozzle component. Arbitrary vertical sections through the axis of symmetry of the nozzle will thus always result in the shape of the Venturi nozzle. The effect of the nozzle does not only result from the geometry of the convexly curved semi-surface of the upper and lower components of the nozzle but also of their distance from each other. The rotational symmetry of the nozzle causes it to function identically regardless of the direction. An air penetration opening is disposed in the surface at which the lower component of the nozzle is connected to the sensor housing. The dimensions of the air penetration opening substantially correspond to the dimensions of the air output opening of the sensor housing above the blower for the forced air feeding. As a necessary yet sufficient minimum three spacers are provided to prevent buckling under load and to ensure the symmetry in case of strong winds. While fewer than three spacers result in a particularly unstable connection between the upper and lower components of the nozzle, more than three spacers lead to unnecessary interference with air flow through the nozzle. For favorable flow conditions the spacers may be designed to be of a smooth circular cross-section and may be provided with threaded ends for connection with complementary lugs or recesses in the upper and lower components of the nozzle by means of washers and nuts. The spacers and the nozzle components may, however, also be connected by any of the methods well-known to persons skilled in the art such that they cannot be severed, such as, for instance, adhesive.

Another advantageous embodiment of the outside air thermometer results if the diameter of the rotationally symmetric components is one to two times the diameter of the sensor housing and if the greatest ratio between diameter and height of their facing convex semi-surfaces is between 50:1 and 5:1. To be functioning properly the outer diameter of the nozzle should be no less than the diameter of the sensor housing at the point of connection. As a rule this will be the largest diameter of the sensor housing. In this manner the wind will unimpededly impinge upon the nozzle. A larger diameter may counteract turbulence at the intake of the nozzles which might result from a possible unfavorable configuration of the sensor housing. The degree of constriction of the wind tunnel in the nozzle is determined by the desired suction and in relation to the power of the blower as well as by the expected wind force. The larger the ratio between the outer intake and medium penetration diameter the greater will be the action of the nozzle and, hence, of the suction. It is also advantageous if the symmetrical cross-section of both semi-surfaces of the rotationally symmetric components is of the same convex shape. Thus, during manufacture of the nozzle two identical shapes can be efficiently used for the upper and lower components of the nozzle. The lower component then needs only to be appropriately shaped for forming the air penetration opening therein. The convex semi-surface at the sides of the upper and lower components of the nozzle facing away from the actual nozzle affects the flow behavior of the ambient air in a manner which reduces turbulence and thus serves to provide unimpeded flow through the nozzle as well as to reduce noise.

A particularly advantageous embodiment is obtained by fabricating the rotationally symmetric components as light structures with smooth surfaces. Weight reduction in proportion to the required load-bearing capacity generally improve the handling during set-up and transport and may very well be more cost-efficient that solid heavy structures. Again, smooth surfaces lead to reduced turbulence and improved flow and noise conditions at the nozzle. The light structure may advantageously be form as a hollow member having a self-supporting shell or housing. Hollow bodies are light, and their manufacture poses no difficulties. The material strength of the self-supporting housing must be such as to withstand mechanical stresses without deformations during transport and operation. To avoid thick-walled housings the light structure may advantageously be formed with a braced, honeycomb, sponge or foam internal structure with a shell which is not self-supporting. Such structures may be formed by well-known manufacturing methods. They offer the advantage of an internal form stability even with only a thin coating for forming a smooth surface or a compressing and smoothing final process for forming a skin on a sponge or foam-like structure.

DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will be best understood from the following description when read with reference to the drawings, in which:

DESCRIPTION OF THE CURRENTLY PREFERRED EMBODIMENT

Figure 1:
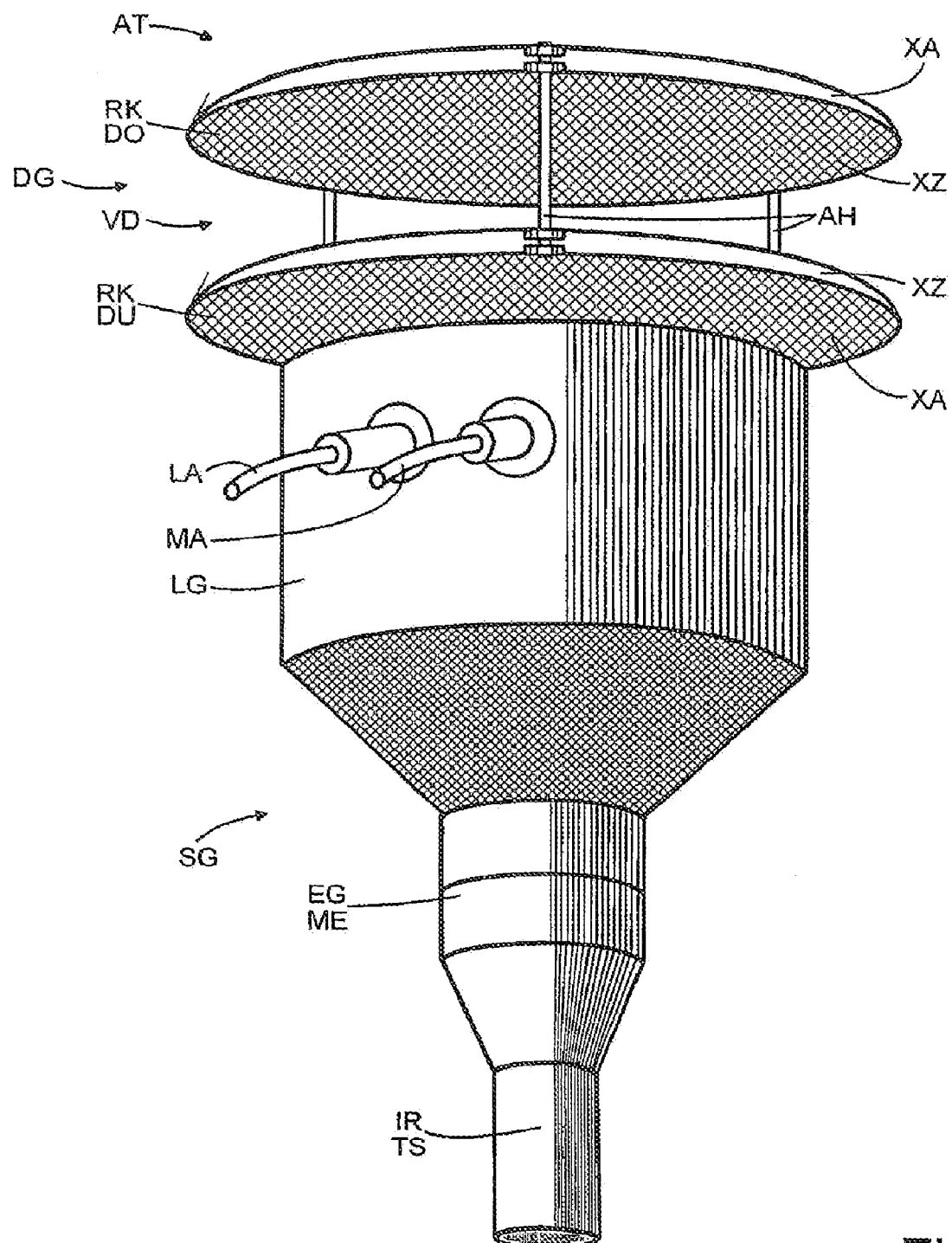
FIG. 1 is a perspective view of the outside air thermometer in accordance with the invention.

FIG. 1 shows a perspective view of the outside air temperature thermometer AT, herein sometimes referred to as a gage. It is seen to be provided with a sensor housing SG which in turn is provided with an insulating tube IR for receiving a temperature sensor TS, a housing section EG for receiving measuring electronics ME connected to the temperature sensor TS and a blower housing LG having a power connector LA and a connector MA for the measuring electronics. A nozzle VD provided with a nozzle housing DG is connected to the upper section of the sensor housing SG. The nozzle housing DG includes two rotationally symmetric components RK, to wit a lower component DU of the nozzle and an upper component DO of the nozzle. The sides of the of the two nozzle components DU, DO facing each other are convexly shaped semi-surfaces XZ. In the embodiment shown the surfaces of the nozzle components DU, DO facing I opposite direction are convexly shaped semi-surfaces XA as well. The two nozzle components DU, DO are fixedly held together by a plurality of, here three, spacers AH. The outside air thermometer AT is adapted to be mounted by a bracket (not shown) at some spacing to a mast (also not shown).

Figure 2:
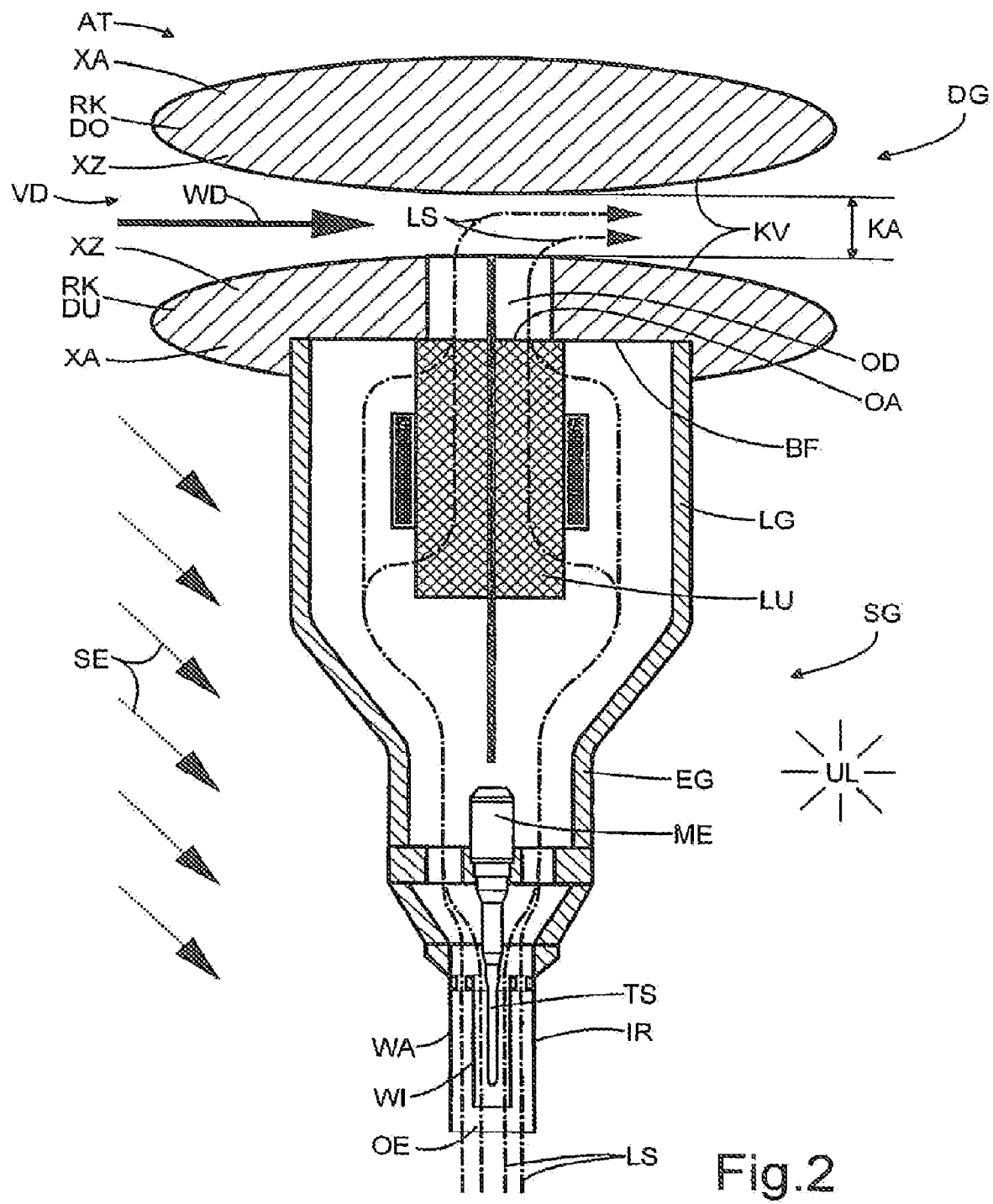
FIG. 2 depicts a flow model of the forced ventilation at a vertical section through the outside air thermometer.
Figure 3A:
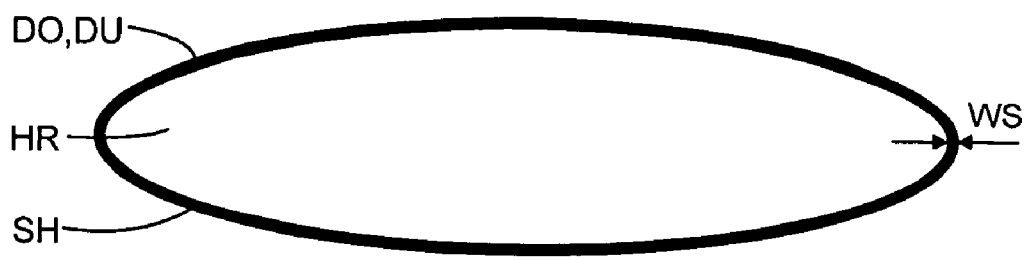
FIG. 3 shows examples of structures of the upper and lower components of the nozzle.
Figure 3B:
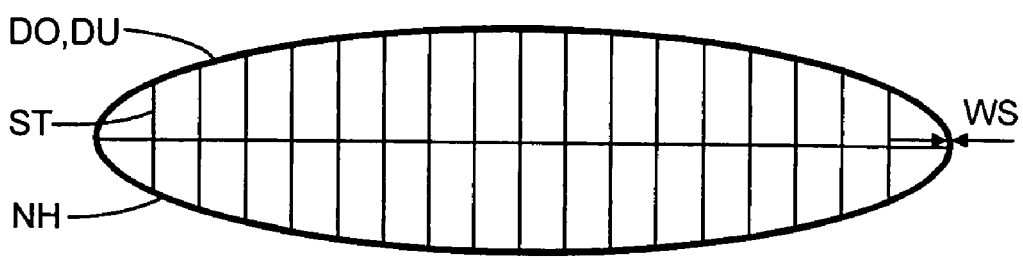
Figure 3C:
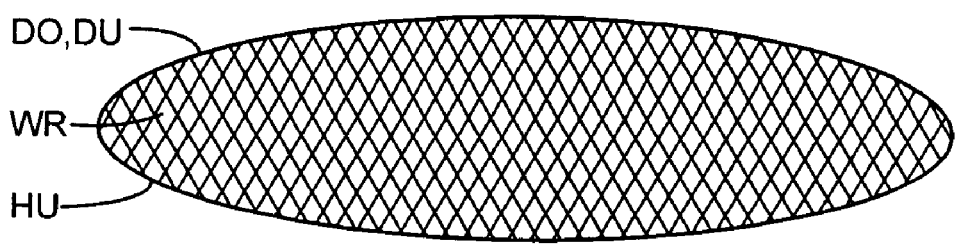
Figure 3D:
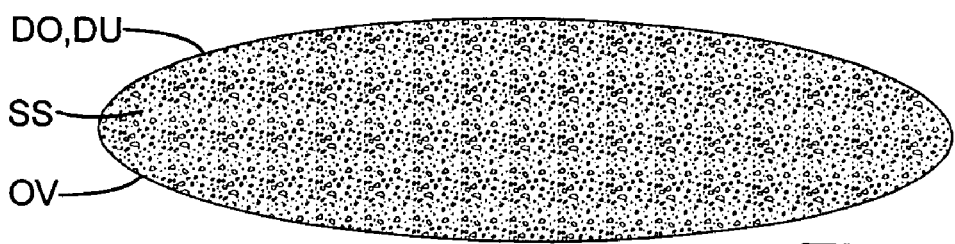

FIG. 2 depicts a flow model of the forced ventilation in a vertical section through the outside air thermometer AT. An air current LS of the ambient air UL to be measured is fed from below through an air input opening OE into the insulating tube IR having the temperature sensor TS mounted in the interior thereof. The insulating tube IR is a double-walled structure having an external wall WA and an internal wall WI. The double-walled construction serves to insulate the temperature sensor TS from sun irradiation SE, with a greater share of the ambient air UL being fed through the chamber formed between the external wall WA and the internal wall WI for dissipating the heat of sun irradiation SE from the external wall WA and to divert it from the temperature sensor TS. The air current LS is then fed through housing section EG of the measuring electronics ME, sucked through the blower LU and fed out through an air output opening OA of the sensor housing SG and an air penetration opening OD in the nozzle VD and the nozzle hosing DG formed by the rotationally symmetric components RK. The air current LS is then picked up by the wind WD and distributed in ambient air UL. A fastening surface BF of the lower component DU of the nozzle VD is attached by means not shown to the upper section of the sensor housing SG, the blower LU being shown as a double blower provided with two lateral intake surfaces. The output surface of the blower LU—in the present embodiment it is the upper surface of the blower LU—terminates in the same plane as the upper section of the blower housing LG and is disposed directly below the air penetration opening OD of the lower component DU of the nozzle. The upper component DO of the nozzle is concentrically connected to the lower component DU by spacers AH not shown in this figure. The smallest space KA between the upper and lower nozzle components DO, DU and the shape of KV of the curves of their facing semi-surfaces XZ determines the operation of the nozzle VD with respect to the suction effect at different wind conditions.

FIG. 3 depicts various examples of structures for upper and lower nozzle components DO, DU. Mounting surfaces BF and air penetration openings OD have not been shown here. FIG. 3a shows a hollow space HR in a self supporting shell SH. This represents the simplest example of a light weight structure and its wall thickness WS offers sufficient strength to withstand buckling and deformation during transport and operation. FIG. 3b depicts a somewhat more complex variant provided with braces ST and a self-supporting shell NH of a wall thickness WS significantly less than that of FIG. 3a. The more closely the braces ST are spaced the thinner the thickness of the wall WS may be. FIG. 3c depicts a self-supporting honeycomb structure WR having only a cover-like shell HU to provide a surface of the requisite smoothness. Finally, FIG. 3d shows a variant of a sponge or foam-like structure SS having smooth surface formed by surface compaction of the material. In this variant it is particularly simple to provide the necessary shaping of the lower nozzle component DU with mounting surface BF and air penetration opening DO and any lugs on both nozzle components DO, DU for attaching spacers. Since a massive variant of upper and lower nozzle components DO, DU is considered to be of trivial significance none has been shown but its structure may be assumed to be obvious to any person of ordinary skill in the art.

Having described our invention, what we claim is:

1. An apparatus for measuring outside air temperature, comprising:
   a housing provided with input and output openings for feeding a current of outside air through the housing;
   a temperature sensor mounted within the housing;

means for moving the ambient air by suction through the housing and across the temperature sensor;

a Venturi nozzle connected to the output opening and provided with a nozzle housing forming an air penetration opening that is connected to the output opening and disposed orthogonally relative to a direction of the Venturi nozzle so as to generate vacuum pressure at the air penetration opening by wind moving through the nozzle housing past the air penetration opening.

2. The apparatus of claim 1, wherein the Venturi nozzle comprises concentrically aligned, rotationally symmetric upper and lower nozzle components provided with convexly curved semi-surfaces facing and disposed at a predetermined distance from each other so as to determine the suction effect of the Venturi nozzle.

3. The apparatus of claim 2, wherein the lower nozzle component is mounted free of gaps on the sensor housing and the air penetration opening is disposed in the lower nozzle component in alignment with the output opening.

4. The apparatus of claim 2, wherein the spacing between the convexly curved semi-surfaces diminishes uniformly from all directions toward the center of the semi-surfaces.

5. The apparatus of claim 2, wherein the diameter of the upper and lower nozzle components is from about one time to two times the diameter of the housing.

6. The apparatus of claim 5, wherein the ratio of height to diameter of the convexly curved semi-surfaces is from about 50:1 to about 5:1.

7. The apparatus of claim 2, wherein the upper and lower nozzle components are formed as light structured upper and lower nozzle components provided with a smooth surface.

8. The apparatus of claim 7, wherein the light structured upper and lower nozzle components are formed as hollow bodies comprising a self-supporting shell.

9. The apparatus of claim 7, wherein the light structured upper and lower nozzle components each comprise a plurality of braces and non-self-supporting shell.

10. The apparatus of claim 7, wherein the light structured upper and lower nozzle components each comprise a honeycomb structure provided with a cover-like shell.

11. The apparatus of claim 7, wherein the light structured upper and lower nozzle components each comprise one of a foam-like and sponge-like structure provided with a smooth surface formed by compaction.

12. The apparatus of claim 7, wherein the convexly curved semi-surfaces of the upper and lower nozzle components are of symmetrical cross-section.

13. The apparatus of claim 12, wherein the symmetrical cross-section is identical for the upper and lower nozzle components.

14. The apparatus of claim 13, wherein the lower nozzle component is provided with one of a flat surface and recess for connecting to the sensor housing.

15. An apparatus for measuring outside air temperature, comprising:

a housing provided with input and output openings for feeding a current of outside air through the housing;

a temperature sensor mounted within the housing;

means for moving the ambient air by suction through the housing and across the temperature sensor;

a Venturi nozzle connected to the output opening and provided with a housing forming an air penetration opening disposed orthogonally relative to the outside air current in a direction of the Venturi nozzle so as to generate vacuum pressure at the air penetration opening by the outside air current moving through the housing, wherein the Venturi nozzle comprises concentrically aligned, rotationally symmetric upper and lower nozzle components provided with convexly curved semi-surfaces facing and disposed at a predetermined distance from each other so as to determine the suction effect of the Venturi nozzle.

16. The apparatus of claim 15, wherein the lower nozzle component is mounted free of gaps on the housing and the air penetration opening is disposed in the lower nozzle component in alignment with the output opening.

17. The apparatus of claim 15, wherein the spacing between the convexly curved semi-surfaces diminishes uniformly from all directions toward the center of the semi-surfaces.

18. The apparatus of claim 15, wherein a diameter of the upper and lower nozzle components is from about one time to two times a diameter of the housing.

19. The apparatus of claim 15, wherein a ratio of height to diameter of the convexly curved semi-surfaces is from about 50:1 to about 5:1.

20. The apparatus of claim 15, wherein the upper and lower nozzle components are formed as light structured upper and lower nozzle components provided with a smooth surface.

* * * * *